(12) United States Patent
Harris et al.

(10) Patent No.: US 8,894,740 B2
(45) Date of Patent: Nov. 25, 2014

(54) PROCESS FOR THE RECOVERY OF GOLD FROM AN ORE IN CHLORIDE MEDIUM WITH A NITROGEN SPECIES

(75) Inventors: Bryn Harris, Montreal (CA); Carl White, Gaspe (CA)

(73) Assignee: Neomet Technologies Inc. (CA)

( * ) Notice: Subject to any disclaimer, the term of this patent is extended or adjusted under 35 U.S.C. 154(b) by 201 days.

(21) Appl. No.: 13/579,841

(22) PCT Filed: Feb. 4, 2011

(86) PCT No.: PCT/CA2011/000143
§ 371 (c)(1),
(2), (4) Date: Oct. 31, 2012

(87) PCT Pub. No.: WO2011/100821
PCT Pub. Date: Aug. 25, 2011

(65) Prior Publication Data
US 2013/0220079 A1    Aug. 29, 2013

Related U.S. Application Data

(60) Provisional application No. 61/305,718, filed on Feb. 18, 2010, provisional application No. 61/320,004, filed on Apr. 1, 2010, provisional application No. 61/420,500, filed on Dec. 7, 2010.

(51) Int. Cl.
| | | |
|---|---|---|
| *C22B 3/00* | (2006.01) | |
| *C22B 11/00* | (2006.01) | |
| *C22B 3/06* | (2006.01) | |
| *C22B 3/10* | (2006.01) | |
| *C22B 3/24* | (2006.01) | |

(52) U.S. Cl.
CPC .................. *C22B 11/04* (2013.01); *C22B 3/065* (2013.01); *C22B 3/10* (2013.01); *C22B 3/24* (2013.01)

USPC ............................................. 75/744; 210/649

(58) Field of Classification Search
CPC ............ C22B 3/065; C22B 3/24; C22B 3/10; C22B 11/04
USPC ............................................. 75/744; 210/649
See application file for complete search history.

(56) References Cited

U.S. PATENT DOCUMENTS

| | | |
|---|---|---|
| 2,167,628 A | 8/1939 | Alessandroni |
| 3,202,524 A | 8/1965 | Richmond |

(Continued)

FOREIGN PATENT DOCUMENTS

| | | |
|---|---|---|
| EP | 0124213 | 11/1984 |
| WO | 9511319 | 4/1995 |

(Continued)

OTHER PUBLICATIONS

International Search Report for PCT/CA2011/000143, Completed by the Canadian Patent Office on May 9, 2011, 5 Pages.

(Continued)

*Primary Examiner* — George Wyszomierski
*Assistant Examiner* — Tima M McGuthry Banks
(74) *Attorney, Agent, or Firm* — Brooks Kushman P.C.

(57) ABSTRACT

A process and system for recovery of gold from an ore having the steps of i) providing the ore containing the gold to be recovered, ii) leaching the ore in an oxidative chloride medium, including a nitrogen species to produce a solution comprising gold; and iii) recovering the gold from the solution. The gold in a preferred embodiment is recovered from refractory and carbonaceous ores.

9 Claims, 1 Drawing Sheet

(56) References Cited

U.S. PATENT DOCUMENTS

| | | |
|---|---|---|
| 3,236,596 A | 2/1966 | Duisburg et al. |
| 3,238,038 A | 3/1966 | Hunter |
| 3,682,592 A | 8/1972 | Kovacs |
| 3,764,650 A | 10/1973 | Scheiner et al. |
| 3,903,239 A | 9/1975 | Berkovich |
| 4,058,393 A | 11/1977 | McLaughlin |
| 4,551,213 A | 11/1985 | Wilson |
| 4,878,945 A | 11/1989 | Raudsepp et al. |
| 5,028,260 A | 7/1991 | Harris et al. |
| 5,215,575 A * | 6/1993 | Butler ............... 75/744 |
| 5,364,444 A * | 11/1994 | McDoulett et al. ............ 75/421 |
| 6,315,812 B1 | 11/2001 | Fleming et al. |
| 6,375,923 B1 | 4/2002 | Duyvesteyn et al. |
| 7,166,145 B1 | 1/2007 | Han |
| 7,513,931 B2 | 4/2009 | Thomas |
| 7,803,336 B2 | 9/2010 | Lakshmanan et al. |
| 7,858,056 B2 | 12/2010 | Moyes et al. |
| 2001/0007646 A1 | 7/2001 | Lakshmanan et al. |
| 2005/0066774 A1 | 3/2005 | Asano et al. |
| 2006/0144191 A1 | 7/2006 | Shapovalov et al. |
| 2009/0241735 A1 | 10/2009 | Abe et al. |
| 2010/0058893 A1 * | 3/2010 | Zontov ............... 75/711 |
| 2011/0158869 A1 | 6/2011 | Takahashi et al. |

FOREIGN PATENT DOCUMENTS

| | | |
|---|---|---|
| WO | 0208477 | 1/2002 |
| WO | 2004059018 | 7/2004 |
| WO | 2004087970 | 10/2004 |
| WO | 2006113284 | 10/2006 |
| WO | 2007071020 | 6/2007 |
| WO | 2009153321 | 12/2009 |

OTHER PUBLICATIONS

Demopoulos et al. World of Metallurgy 2008, vol. 61, No. 2, p. 89-98, "New Technologies for HCl Regeneration in Chloride Hydrometallurgy."

* cited by examiner

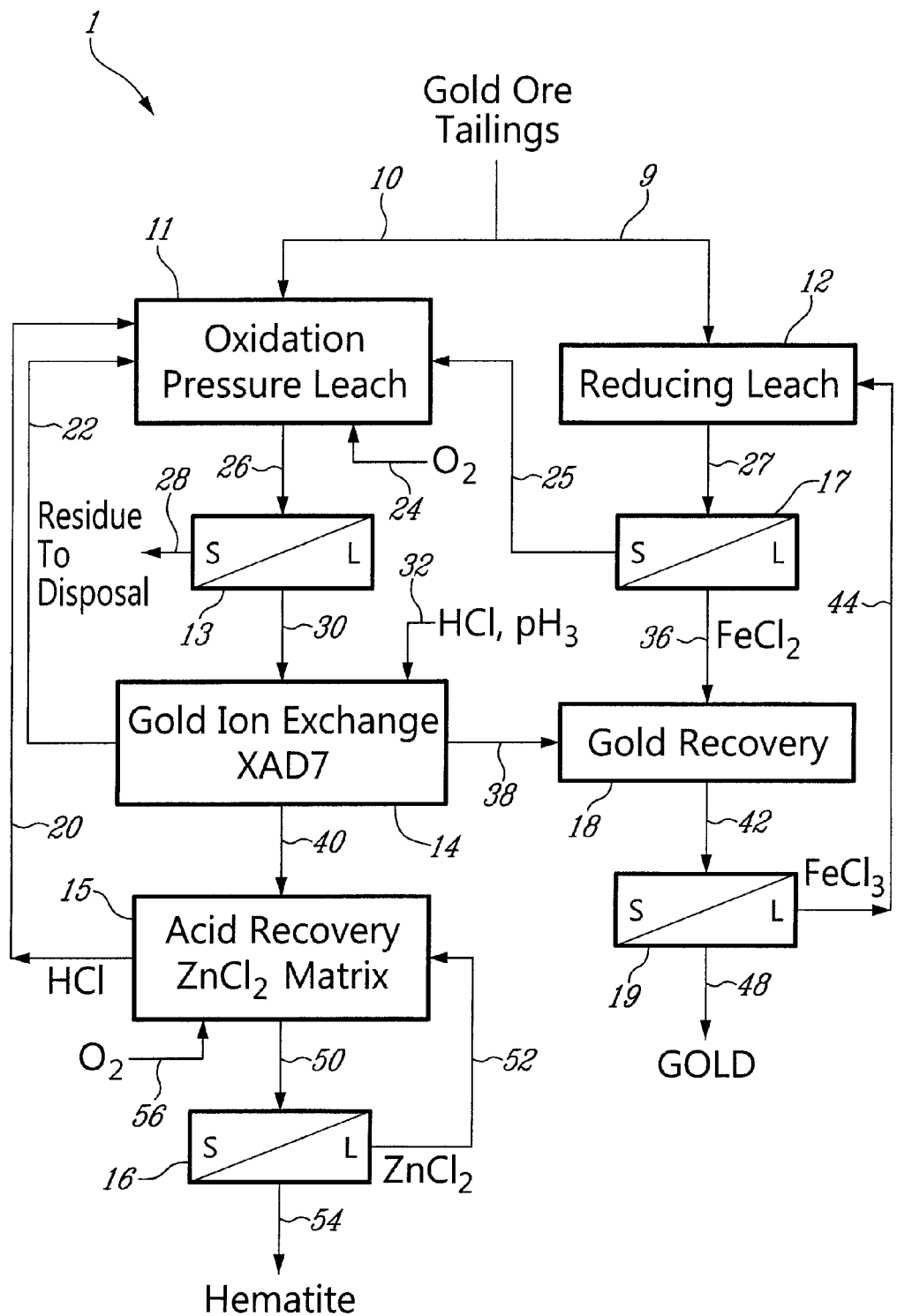

PROCESS FOR THE RECOVERY OF GOLD FROM AN ORE IN CHLORIDE MEDIUM WITH A NITROGEN SPECIES

CROSS-REFERENCE TO RELATED APPLICATION

This application is the U.S. national phase of PCT Appln. No. PCT/CA2011/000143 filed on Feb. 4, 2011, which claims the benefit of U.S. Provisional Application Ser. No. 61/305,718 filed on Feb. 18, 2010, U.S. Provisional Application Ser. No. 61/320,004 filed on Apr. 1, 2010, and U.S. Provisional Application Ser. No. 61/420,500 filed on Dec. 7, 2010, the disclosures of which are incorporated in their entirety by reference herein.

FIELD OF THE INVENTION

The present invention relates generally to a process and a system for the cyanide-free recovery of gold and precious metals from ores, concentrates and intermediates containing same. More specifically relates to a process for the recovery of gold from a refractory and/or carbonaceous ore.

BACKGROUND OF THE INVENTION

The recovery of gold and silver from ores and concentrates has remained largely unaltered for over a century, in that alkaline cyanide solutions have been universally used for their dissolution. Various hydrometallurgical and pyrometallurgical techniques, such as roasting, pressure leaching and alkaline chlorination have been developed, as pre-treatment processes prior to cyanidation, for their recovery from the so-called refractory and carbonaceous feedstocks, where the gold and silver cannot be recovered directly by cyanidation. None of these processes has replaced cyanide as the leaching medium for gold and silver. This is evident from an article by J. O. Marsden entitled Overview of Gold Processing Techniques Around the World, published in Minerals and Metallurgical Processing, August 2006, volume 23, number 3.

Refractory gold ores are ones that are naturally resistant to cyanide leaching. These include, but are not limited to, arsenopyrite ores, where the gold is intimately locked up in the arsenopyrite matrix. In order to liberate the gold, this matrix must be destroyed, which also liberates the arsenic, and hence a separate additional process is required in order to fix the arsenic in an environmentally-acceptable manner. Destruction of the arsenopyrite, and similar gold-bearing matrices, is commonly achieved by pressure oxidation in an autoclave at around 220° C., or by roasting of the ore. Roasting generates an arsenical off-gas also containing sulfur dioxide, which has to be treated for the collection of both of these compounds.

Carbonaceous ores are often amenable to leaching, but once the gold is taken into solution, it is then re-adsorbed by the active carbon in the ore thus making it unrecoverable. Rendering of the carbon passive is also accomplished by roasting, and also by alkaline chlorination (hypochlorite), but this generates a chloride-containing effluent which has to be contained in a dedicated impoundment area.

A number of different leaching agents have been tested without any commercial success in an attempt to replace cyanide for environmental reasons. These compounds include, for instance, thiourea and thiosulfate, which are much more effective for silver than for gold. Thiourea, however, suffers from the same drawbacks as cyanide in that it is toxic and a listed carcinogen.

Wilson in U.S. Pat. No. 4,551,213 Recovery of Gold, issued on Nov. 5, 1985, and the accompanying article An Economical Method for the Recovery of Gold from the Sulphur Containing Residue of a Hydrometallurgical Process in Complex Sulfides, Processing of Ores, Concentrates and By-Products (A. D. Zunkel, R. S. Boorman, A. E. Morris and R. J. Wesely, Editors), published by TMS in 1985, developed a process for the recovery of gold from their CLEAR (Copper Leaching, Electrowinning and Recycle) Process residues using highly concentrated cupric chloride.

The Wilson process uses a high oxidation potential (650-750 millivolts) of cupric and/or ferric chloride in concentrated solutions (12 weight percent of chloride) at temperatures up to 106° C., the boiling point of such solutions. The gold is recovered directly by electrolysis or by adsorption onto activated carbon.

Such a process is capable of dissolving gold from a variety of feed materials, and is effective with some, but not all refractory-type gold ores, since the patent notes that pyrite remains in the residue. Pyrite is a noted host of gold values. It is also not effective with carbonaceous ores, where the active carbon in the ore adsorbs any gold dissolved, as evidenced by the fact that active carbon is one of the chosen methods for recovery of gold from the solution.

Intec Limited recently published on their web site www.intec.com.au in March, 2009 a halide-based process, The Intec Gold Process. This process makes us of the unique properties of Halex™, a composite chloride-bromide ion with a high oxidation potential. The Intec Process is operated at temperatures below 95° C. in 6-8M chloride solutions. Leaching time can be up to 10 hours.

Higher temperatures cannot be employed in the Intec Process because it would render the Halex™ molecule unstable. The Intec publication notes that carbonaceous ores cannot be treated by this process, the reasons being the same as for the Wilson process above.

The use of halides, particularly chloride, has been employed in pressure leaching situations to dissolve gold and precious metals, as described by Christopher A. Fleming et al., in U.S. Pat. No. 6,315,812 Oxidative Pressure Leach Recovery Using Halide Ions. In this process, halide ions, especially chloride ions (preferably in the range up to 10 g/L), are added to a pressure leaching autoclave at temperatures >200° C., wherein the gold and platinum group metals are dissolved into solution. They are subsequently recovered by one of a variety of methods.

Yoshifumo Abe, et al., in US Patent Application US 2009/0241735 A1, dated Oct. 1, 2009 for recovering gold from copper sulfide ores. The process uses both ferric and cupric chloride, but no acid is added, and works better if bromide ions are also present, in accordance with the process of Intec described above. The examples in the application indicate that extraction from ores containing less than 10 g/t gold would not proceed, and therefore that the process would not work on typical gold ores which usually contain gold in the concentration range 1-5 g/t.

No indication is given of how the spent leaching solution would be treated, since it is clear that the process also dissolves iron. The process would be prohibitively expensive without recycle of the chloride ions, and there is no obvious method how this might be achieved. The process as described, therefore, would seem to be wholly unsuited to refractory gold ores.

Another method which has been developed especially for silver is nitrogen species catalysis (known as NSC) in alkaline and acid sulfate media. One article describing these processes is by Corby G. Anderson, Treatment of Copper Ores and Concentrates with Industrial Nitrogen Species Catalyzed Pressure Leaching and Non-Cyanide Precious Metals Recovery in Journal of Metals, April 2003. In these processes, silver and other metals are dissolved into solution using NSC to effect oxidation. Gold remains in the leaching residue, and is subsequently recovered by either conventional cyanidation or by concentrated caustic leaching, causing it to form complex polysulfides.

Rein Raudsepp and Morris J. Beattie, as described in U.S. Pat. No. 4,878,945, Hydrometallurgical Process for Treating Refractory Ores Containing Precious Metals, dated Nov. 7, 1989, also used nitrogen species to break down pyrite and arsenopyrite in refractory ores. In this process, however, gold was not dissolved, and silver only partially, requiring a separate cyanidation or other recovery step. The re-constitution of the nitrogen species was achieved with oxygen in a pressure vessel in a separate leaching step.

NSC has not been used in chloride systems, apart from its use as aqua regia in precious metal refineries, where no attempt is made to collect and re-use the NOx fumes which result from its use. Aqua Regia, however, is one part nitric acid and three parts hydrochloric acid, and has to be mixed in a special way, hence there is a very large concentration of nitric species present, as well as unique NOCl species.

A further impediment to developing any new extractive recovery processes has been the dissolution and subsequent control of iron, which is and has always been considered a major problem in hydrometallurgical processes. In atmospheric processes, the iron is usually eliminated from the process solutions by precipitation with a base such as lime, magnesia or caustic soda, as an oxy-hydroxide, and in higher temperature autoclave processes, as an impure hematite or goethite.

It is evident from the foregoing that although there are techniques available for dealing with the various types of gold ores, there is no one universal method for all types.

SUMMARY OF THE INVENTION

In accordance with a broad aspect of the present invention, a process for recovering gold and precious metals from ores, concentrates and intermediates, especially refractory and carbonaceous materials, containing these elements is described.

In accordance with one aspect of the present invention, there is provided a cyanide-free process for recovery of gold from an ore comprising the steps of: i) providing the ore comprising the gold to be recovered; ii) leaching the ore in a chloride oxidative medium, comprising a nitrogen species to produce a chloride solution comprising gold; and iii) recovering the gold from the chloride solution.

In accordance with another aspect of the present invention, there is provided the process described herein, wherein recovering the gold from the chloride solution is made by iv) contacting the chloride solution comprising gold with a resin adsorbent to selectively adsorb the gold and produce a barren solution; and stripping the gold from the loaded resin adsorbent by elution with diluted hydrochloric acid.

In accordance with yet another aspect of the present invention, gold is recovered separately and in a pure form directly from the leaching medium in the presence of high concentrations of other ions, especially ferric iron. Optionally, silver, rare metals such scandium, gallium germanium and indium, and precious metals if present may also be recovered directly from the leaching solution.

In accordance with still another aspect of the present invention, there is provided the process described herein, wherein the barren solution is treated with a matrix solution to produce the chloride medium which is recycled to step ii), and hematite.

In accordance with yet still another aspect of the present invention, there is provided the process described herein, wherein other precious metals may be recovered from the barren solution before the treatment with the matrix solution.

In accordance with a further aspect of the present invention, there is provided the process described herein, wherein the nitrogen species is regenerated in step ii) with oxygen.

In accordance with yet a further aspect of the present invention, there is provided the process described herein, wherein arsenic species in the ore is converted to stable and environmentally benign scorodite.

In accordance with still a further aspect of the present invention, there is provided the process described herein, wherein the nitrogen species is nitric acid in a concentration of 1 to 50 g/L in the chloride oxidative medium.

In accordance with yet still a further aspect of the present invention, there is provided the process described herein, wherein the nitrogen species is continuously regenerated.

In accordance with one embodiment of the present invention, there is provided the process described herein, wherein the leaching is made at a temperature of 80° C. to 160° C.

In accordance with another embodiment of the present invention, there is provided the process described herein, wherein the ore is a refractory and/or carbonaceous ore.

In accordance with yet another embodiment of the present invention, there is provided the process described herein, wherein the process is free of liquid effluent.

In accordance with still another embodiment of the present invention, there is provided a system for recovering gold from a chloride solution with a nitrogen species, the system comprising: a oxidative pressure leach reactor comprising inlets for a gold containing ore, an oxygen containing gas and a HCl acid; and an outlet for a chloride leach slurry produced in the reactor; a solid liquid separator hydraulically connected to the leach reactor with an inlet for the leach chloride slurry, the separator separating the slurry into a gold bearing chloride solution at a gold bearing chloride solution outlet and undissolved solids; and a gold ion exchange system comprising at least one column comprising a gold adsorbing ion exchange resin compatible with chloride solutions and regenerated with HCl, wherein at least one column is hydraulically connected to the gold bearing solution outlet and produce a barren gold solution at a barren solution outlet.

In accordance with yet still another embodiment of the present invention, there is provided the system described herein, wherein barren solution outlet is hydraulically linked to a HCl recovery system comprising a circulating matrix solution and an injection inlet for an oxygen containing gas.

In accordance with a further embodiment of the present invention, there is provided the system described herein, wherein the HCl recovery system comprises a matrix reactor for recovering hydrochloric acid and for oxidation/hydrolysis of metal from metal chloride solution, the matrix reactor comprising: a tank compatible with a mixture comprising the metal chloride solution, a matrix solution, an oxygen containing gas and a solid comprising a metal oxide, the tank comprising a base, the base defining a first diameter and a first cross sectional area, the base comprising a metal oxide slurry outlet, a matrix solution outlet and a gas inlet; a top opposite the base, the top comprising a solution inlet, a hydrochloric acid outlet, a matrix solution inlet, the top defining gas an expansion zone having a second cross sectional area and, a wall attached to the top and the base defining a volume and a height of the tank; wherein a ratio of the second cross sectional area to the first cross sectional area is greater than 1 and whereby the hydrochloric acid leaves the mixture as a hydrochloric acid containing gas in the gas expansion zone at the top of the tank.

In accordance with yet a further embodiment of the present invention, there is provided the system described herein, wherein the reactor comprises an aspect ratio of the height to the first diameter from 5 to 1-20 to 1.

In accordance with still a further embodiment of the present invention, there is provided the system described herein, wherein the circulating matrix solution comprises $ZnCl_2$.

BRIEF DESCRIPTION OF THE FIGURES

FIG. 1 is a flow diagram of a process for recovery of gold in accordance with an embodiment of the invention.

DETAILED DESCRIPTION OF EMBODIMENTS OF THE INVENTION

The embodiments of the present invention shall be more clearly understood with reference to the following detailed description taken in conjunction with the accompanying drawing.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts and/or steps are marked throughout the specification and the drawings with the same respective reference numerals.

Referring to FIG. 1, there is shown a schematic representation of a process 1 in accordance with an embodiment of the invention. In a particularly preferred embodiment, the process involves the recovery of gold from refractory and carbonaceous materials. FIG. 1 shows the process for refractory gold tailings, but is not limited thereof.

Gold ore tailings 10 are sent to an oxidation pressure leach 11 in recycled hydrochloric acid 20 and a barren solution 22 from ion exchange 14. It has been discovered that the reaction can be catalyzed with small concentrations of nitrogen species, preferably nitric acid. The concentration of nitric acid is between 1-50 g/L, preferably 5-10 g/L in the oxidative pressure leach. The nitric acid reacts with the minerals in the tailings according to the reactions below. The nitrogen oxides generated then react with the oxygen in the gas phase and nitric acid is regenerated, thus the nitrogen species are regenerated with oxygen. Alternatively, the nitrogen oxides may be scrubbed in a separate scrubber, and the nitric acid re-constituted with oxygen therein, and returned to the leaching vessel.

The chloride concentration in the oxidative leach 11 is maintained in a range 1 to 20M, with a preferred range 12 to 15M. Some reactions occurring in the pressure leach are likely:

$$FeS_2+3HCl+HNO_3 \rightarrow FeCl_3+S°+NO+2H_2O \quad (1)$$

$$2FeAsS+6HCl+4HNO_3+O_2 \rightarrow 2FeCl_3+2S°+2H_3AsO_4+4NO+2H_2O \quad (2)$$

$$Au+4HCl+HNO_3 \rightarrow HAuCl_4+NO+2H_2O \quad (3)$$

$$2NO+O_2 \rightarrow 2NO_2 \quad (4)$$

$$4NO_2+O_2+2H_2O \rightarrow 4HNO_3 \quad (5)$$

$$FeCl_3+H_3AsO_4+2H_2O \rightarrow FeAsO_4.2H_2O+3HCl \quad (6)$$

The leach temperature is between 80-160° C., preferably between 110-150° C., and more preferably between 130-140° C. The higher temperatures are preferred if there is carbonaceous material in the feed. In a preferred embodiment the leach reactor includes means of cooling. The cooling may be performed by either evaporative cooling in the vapour space of the reactor or with cooling cools within leaching medium or by both methods. The residence time will vary for different materials, depending on their nature, but is usually between 1 and 4 hours. Oxygen 24 is usually sparged into the oxidative leach at pressures that may vary and are typically in the order of atmospheric to 150 psi, with 25 to 75 psi a preferred embodiment. The oxidative pressure leach produces a chloride leach slurry 26, that includes a gold bearing chloride solution and undissolved solids.

Arsenic is first dissolved and then reacts with ferric iron to precipitate the mineral scorodite ($FeAsO_4.2H_2O$) which is one of the most stable forms of arsenic known. Thus, the arsenic is rendered stable and the gold is recovered in one single step. It is apparent that reaction (6) re-generates some hydrochloric acid, which can then be re-used in reactions (1) and (2). Thus, the amount of HCl that must be added to the leaching will depend upon the make-up of the minerals being added to the leaching step.

In another aspect of the invention, refractory gold minerals such as arsenopyrite are broken down, not only releasing the gold, but also the arsenic is converted into a stable environmentally-benign compound.

Arsenic is a major nuisance element in gold processing, since gold is often associated with arsenopyrite which not only renders the gold ore refractory, but also incurs additional costs in order to dispose of it. This is achieved conventionally by high pressure (150-200 psi), high temperature (220° C.) oxidation in an autoclave, which breaks down the arsenopyrite and converts it into a stable arsenic mineral. The residue so-produced proceeds to cyanidation, which occurs at high pH (9-11) for gold leaching, conditions which can promote re-dissolution of the arsenic.

Alternatively, such ores undergo a roasting step, wherein the arsenic is fumed off and collected as arsenic trisulfide or arsenic trioxide, both of which require further treatment in a separate process to render the arsenic stable and suitable for disposal into the environment.

Following leaching 11, the leach slurry 26 is sent to solid/liquid separation 13, where the solids 28 are separated from the Au bearing solution 30. Any suitable separation device may be employed. The solids are discarded and the solution 30 proceeds to gold recovery. The gold is dissolved without recourse to the use of cyanide, the present process is cyanide free. Cyanide-free is understood to mean that no cyanide reagents are added to the process 1 to extract gold.

Therefore, it is another aspect of the invention that cyanide is not required for the recovery of the gold.

There are several ways of recovering gold from the leach filtrate. Activated carbon may be used, but it will recover all of the precious metals at once. The use of activated carbon for gold recovery in highly oxidised chloride solutions is not as efficient as it is in cyanide solutions. The preferred method is to use a resin adsorbent which is specific for gold in these solutions. At least two adsorbents have been identified, being XAD-7 and XAD-8, the use of both of which has been described for dilute refinery solutions to remove residual gold values by Bryn G. Harris et al., Recovery of Gold from Acidic Solutions, U.S. Pat. No. 5,028,260 issued on Jul. 2, 1991, incorporated herein by reference.

Surprisingly, it has been found that these adsorbents, especially XAD-7, are also highly effective for gold recovery from concentrated ferric chloride solutions, also containing high concentrations of arsenic and some nitrate ions, and at temperatures up to 100° C. Normally in hydrometallurgical processes, high concentrations of ferric iron prevent the recovery of any other metals until the iron has been removed from solution.

Gold is therefore recovered by ion exchange resin adsorption 14, preferably XAD-7. If there are silver and platinum-group elements in the solution, these may optionally be recovered by adsorption on activated carbon from the solution exiting the XAD-7 adsorption (not shown).

The gold is eluted from the resin by very dilute hydrochloric acid 32 (in a preferred embodiment at pH 3), to give a pure gold chloride solution. Pure gold can be recovered by precipitating 18 any one of a variety of reductants known to those skilled in the art, including but not limited to ferrous chloride, sulfur dioxide gas, sodium sulfite, formic acid, sodium formate and oxalic acid. In this embodiment, the preferred method is for gold to be precipitated from this solution 18 of dilute HCl by the addition of ferrous chloride solution 36, which may be then be regenerated within the flowsheet. The reaction for this process is:

$$HAuCl_4 + 3FeCl_2 \rightarrow Au + 3FeCl_3 + HCl \quad (7)$$

Therefore in a preferred embodiment the solution comprising gold is contacted with an adsorbent ion exchange resin that selectively adsorbs gold onto the resin and to produce a barren gold solution 40. The gold is stripped from the resin with a dilute HCl solution 32 having a pH from 2 to 6. The stripped Au solution 38 is reacted with $FeCl_2$ 36, to precipitate Au and produce a suspension 42.

The gold suspension 42 is filtered from the dilute HCl solution by any suitable solid/liquid separation 19 device such as a pressure or vacuum filter, to produce a gold solid 48. The ferric chloride 44 so produced by the reaction for precipitating the gold is recycled to a leaching step 12 where a small amount of feed tailings 9 are added. This causes the ferric chloride to react with pyrite and regenerate the ferrous chloride, according to the following reaction:

$$FeS_2 + 3FeCl_3 \rightarrow 3FeCl_2 + S° \quad (8)$$

Following regeneration, the slurry 27 proceeds to solid/liquid separation 17, which may be carried out by any suitable device such as a pressure or vacuum filter. The solids 25 are returned to the oxidation pressure leach 11, and the ferrous chloride solution 36 proceeds to gold recovery/precipitation.

The barren solution 40 exiting the resin adsorption stage 14 (or after the optional silver and platinum group metals separation) is injected into a matrix solution in an HCl acid recovery step 15, preferably zinc chloride, at 150-220° C., preferably 170-180° C. to form hematite and hydrochloric acid according to following chemical reaction:

$$2FeCl_3 + 3H_2O \rightarrow Fe_2O_3 + 6HCl \quad (9)$$

This acid recovery and solid/liquid separation steps 15 and 16 produce HCl acid 20 that is recycled to the oxidative pressure leach 11, and are the subject of separate concurrent applications U.S. 61/305,718 and U.S. 61/420,500, both of which are incorporated herein by reference.

The matrix solution used in the present process 1, may be any compound which is capable of being oxygenated to form, even transiently, a hypochlorite compound, and which remains liquid at temperatures up to at least 190° C. It is also preferable that said matrix solution will act as a solvent for any base and light metals which might be present in the feed ferrous or ferric iron solution. In practice, there are very few such materials. Zinc chloride is a preferred matrix. Other such compounds are calcium chloride and magnesium chloride, and it is understood that there may be other such matrices alone or in combination. In this application, particularly where the feed is a barren gold solution comprising ferrous and/or ferric chloride, zinc chloride is preferred since it is both a chloride salt and remains liquid to a temperature >250° C. In a nitrate medium, suitable matrices may be silver nitrate and zinc nitrate.

The matrix solution remains fluid at such temperatures, and the hematite solids are removed by any suitable separation device, for example hot vacuum or pressure filtration.

The matrix solution is substantially inert, but acts as a catalyst for oxygen transfer to accelerate the oxidation and hydrolysis reactions. The matrix solution is generally a molten salt hydrate, e.g. $ZnCl_2 \cdot 2H_2O$ in a liquid state and in various states of hydration $ZnCl_2 \cdot 2H_2O$ to $ZnCl_2 \cdot 5H_2O$ depending on the temperature.

With regard to nomenclature, the term "ferrous chloride solution" applies to any metal chloride solution containing ferrous iron however derived, whether, for example, from an ore or concentrate leaching process, or from, for example, a steel mill pickling process.

The definition of a base metal is understood as a non-ferrous metal but excluding the precious metals (Au, Ag, Pt, Pd, etc.).

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts and/or steps are marked throughout the specification and the drawings with the same respective reference numerals.

Referring to FIG. 1, there is shown a schematic representation of a process 1 in accordance with an embodiment of the invention. Broadly speaking, the acid recovery $ZnCl_2$ matrix process 15 involves the recovery of iron material, and hydrochloric acid from a chloride-based barren gold solution/liquor 40, containing ferrous iron, ferric iron (and possibly base metals), that might be derived from a refractory gold ore. The method is conducted in an inert matrix solution according to one embodiment of the present invention, the method steps comprising: an iron oxidation 6, iron hydrolysis with HCl removal 20 and hematite slurry production 50, solid/liquid separation 15 of the hematite 54, and recycle of the inert matrix solution 52.

The barren gold liquor solution 40 is added and mixed into the matrix solution together with air or oxygen 56 at 130-150° C. to produce a reaction mixture. Any ferrous iron may be oxidized by and subsequently hydrolysed by water at 170-180° C. to form hematite according to the following chemical reactions with HCl 20 produced:

$$12FeCl_2 + 3O_2 \rightarrow 2Fe_2O_3 + 8FeCl_3 \quad \text{I}$$

$$4FeCl_2 + O_2 + 4H_2O \rightarrow 2Fe_2O_3 + 8HCl \quad \text{II}$$

$$2FeCl_3 + 2H_2O \rightarrow Fe_2O_3 + 6HCl \quad \text{III}$$

Therefore the reaction mixture 50 includes: the liquor solution, the matrix solution, the precipitating metal solids, any dissolved solids, unreacted oxygen and HCl. Whilst air can be used to effect the oxidation, its use is not recommended, unless sub-azeotropic (<20% HCl) hydrochloric acid is acceptable to the overall process. This is because the large quantity of nitrogen present in air requires the addition of water to scrub the hydrochloric acid liberated into the off-gas system.

FIG. 1 shows separate iron oxidation and iron hydrolysis/precipitation steps, combined into a single step at the higher temperature of 170-180° C., however they may be conducted separately.

Following the hydrolysis/precipitation 15 step, the remaining solution 50/reaction mixture (now an iron-depleted matrix chloride liquor) including the hematite product 54 are then subjected to a solid/liquid separation step 16. The hematite product 54 thus recovered may be dried and sold, or simply disposed of.

Sulfates may be present in the chloride feed solution, especially if such solution derives from the leaching of refractory gold ores. Normally, the precipitation of jarosites might be expected from the combination of ferric iron, sulfate and high temperatures, as is widely practiced in the zinc processing industry. However, sulfates have been shown to have no impact at all on said iron precipitation process, and remain in the solution phase. If desired, sulfates may be removed by precipitation as calcium sulfate (gypsum, hemihydrate or anhydrite) by the addition of calcium ions at any point in the flowsheet.

Once the iron has been removed (via stream 54), most of the metal-rich matrix solution is simply recycled 52 in order to build up the concentration of base metals, and a bleed (not shown) can be hydrolyzed by heating to 180-200° C., more preferably 180-185° C., and water or steam injection. This causes the base metals to precipitate as the basic chlorides and HCl to be produced, according to the equations below, where Me represents, for example, copper, nickel or cobalt.

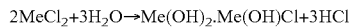

$$2MeCl_2 + 3H_2O \rightarrow Me(OH)_2 \cdot Me(OH)Cl + 3HCl \qquad IV$$

The basic chlorides may be separated by any suitable separation device. The base metal basic chlorides may precipitate and be separated together, but it has been found in practice that copper, nickel and cobalt may be individually recovered, or redissolved, separated and recovered by any method known in the art such ion exchange, solvent or electrowinning. The remaining liquor from solid/liquid separation may be recycled, and even combined with other recycles, and returned to the top of the process 1.

The acid recovery $ZnCl_2$ matrix reactor in a preferred embodiment is a column reactor, defined as tank with a height that is greater than its diameter by at least 5 times. A column reactor is distinguished from a stirred tank reactor, in that it does not have mechanical agitation. In a particularly preferred embodiment the column reactor the liquid flow through the column reactor is downward and countercurrent to the oxygen containing gas flow upward through the column reactor. Advantages of such a column reactor include a preliminary separation of hematite solid in the direction liquid flow downward towards a solids separation apparatus. In a stirred tank reactor the solids would remain equally suspended. However, the process could be performed at lower efficiency in a stirred tank reactor as will be seen in the Examples.

Broadly speaking, the process within the column reactor involves the oxidation and hydrolysis of ferrous iron of the ferrous chloride solution with recovery of associated hydrochloric acid and an iron material (hematite). One embodiment of the reactor includes electrical heating coils which are used to heat the reactor to maintain the desired temperature of operation. The heating coils can alternatively be replaced with a jacketed reactor with a thermal fluid such a steam as the heating medium.

It is an aspect of the invention to provide an acid recovery $ZnCl_2$ matrix process which permits the oxidation and subsequent hydrolysis of ferrous iron to form hematite and hydrochloric acid. It has been discovered that this can be achieved by adding the said ferrous iron solution into an oxygenated matrix solution at 130-180° C., preferably 140-160° C., wherein the ferrous iron is oxidised and then hydrolyses and precipitates as hematite with simultaneous recovery of hydrochloric acid which distils off and is collected in an off-gas system to be recycled to the leaching stage.

In a further embodiment of the acid recovery $ZnCl_2$ matrix process, there is provided a column reactor, in which the oxygen gas is injected at the bottom and the barren solution 40 comprises ferrous iron chloride, is injected on its own, or simultaneously with ferric iron chloride, from the top of the reactor. The weight of the liquid in column, of height 1-2 meters, and preferably 1.4-1.8 meters, holds up the oxygen gas in the column, thereby providing sufficient time for the reactions to take place. There may be a plurality of such reactors, maintained at a temperature of 109-250° C. In a specific embodiment of the invention, the first reactor is preferably at 130-170° C., and more preferably at 140-160° C.

The temperature of additional column reactors in series may be raised to 170-250° C., and more preferably to 180-200° C., in order for the hematite particles to grow. It has been discovered that by maintaining temperature gradients, different particle sizes of hematite in the range 1-100 microns may be formed, thus generating hematite particles with differing color and size. Finer particles will be red in colour, whereas larger, more dense particles vary in color from purple to black.

At the base or base portion of the column reactor, an oxygen containing gas such as air and/or preferably oxygen is injected through an inlet into the reactor. The material of construction may be a glass pipe, held together with external iron fittings. Clearly, any other compatible material of construction, such as PTFE (polytetrafluoroethylene) and/or PFA (polyfluorolokxy resin) and both known under the name Teflon™) lined steel, glass lined steel, graphite, titanium alloys as well as fiberglass reinforced resin (FRP) alone or as a support for PFTE or PFA may be used and are known to the skilled person. The reactor has an aspect ratio of reactor height to diameter (in the base portion 110) of from 5 to 1 to 20 to 1.

A top or top portion of the reactor comprises a further sampling or injection unit, as well as a gas expansion zone. The top portion further includes a ferrous chloride solution feed inlet, a hydrochloric acid collection outlet and an optional gas outlet, if a second reactor is connected in series.

The base of the reactor may also include a further inlet for recycled gas, where this gas comprises HCl and oxygen recycled generally from the top or top portion of the reactor. The base defines a first diameter and a first cross sectional area (FIG. 8). The base also includes an adjacent sampling and injection assembly unit.

The uppermost sampling and injection port typically includes an inlet for the circulation of the matrix solution.

The matrix solution is usually withdrawn from the bottommost sampling and injection unit via outlet. From this outlet the matrix solution including a slurry of produced hematite is pumped to a solid removal step, such as filtration.

In a specific embodiment of the invention, the first reactor 100 is preferably at 130-170° C., and more preferably at 140-160° C.

The oxygen sparged into the base of the reactor, is preferred over air if concentrated hydrochloric acid (>20% by weight) is desired. The recycled gas through inlet added at the base of the reactor increases the utilisation efficiency of the gas.

A single sampling and injection unit above the gas inlet ports at the base of the column reactor. The base portion comprises a first cross-sectional area 116 that remains substantially constant through the sampling of injection unit 130, and along the greater (at least 80%) of the reactor length upward.

The sampling point of the column rector may include a plurality of ports used for various purposes. The ports of the unit include but are not limited to: injection port, that includes one or more injection valves, generally used for recycling (inlet matrix solution with or without solids): sampling ports that may be in any orientation including a horizontal or downwardly descending orientation, each sampling port including valves. The sampling port may also include ports for a thermocouple and/or a pH/ORP (oxidation reduction potential) probe, is optionally found at a plurality of positions along the length of the reactor.

As previously described, the present reactor is meant to oxygenate the matrix solution that generates a concentration, however transient, of hypochlorite, according to the following reaction (using zinc as an example):

$$ZnCl_2 + O_2 \rightarrow Zn(OCl)_2 \quad (1)$$

This reaction is favoured in the temperature range 140-160° C., and if there is relatively little associated free water present. Free water is water which is purely a solvent and is not bound in any way to the ions of the matrix compound. As described earlier, the zinc chloride is present as a molten salt hydrate, thus satisfying these requirements.

The ferrous chloride solution may be added from the top of the reactor, such that it meets the oxygenated matrix solution countercurrently. The hypochlorite solution is a very powerful oxidant and thus highly reactive, and instantaneously reacts with the ferrous iron according to the following reaction:

$$Zn(OCl)_2 + 4FeCl_2 + 4HCl \rightarrow 4FeCl_3 + ZnCl_2 + 2H_2O \quad (2)$$

The HCl for reaction (2) is provided by reaction III (previously presented):

$$2FeCl_3 + 2H_2O \rightarrow Fe_2O_3 + 6HCl \quad III$$

The overall effect is thus as shown in reaction II (also previously presented):

$$4FeCl_2 + O_2 + 4H_2O \rightarrow 2Fe_2O_3 + 8HCl \quad II$$

Additional water for the reaction is provided by that associated with the incoming barren solution. The concentration of the incoming feed solution may be adjusted to give the desired strength. The matrix reactor also has ports for the addition of fresh ferrous iron feed, a port for the collection of hydrochloric acid vapour, and a third port for unused oxygen gas to proceed to the next reactor.

A single reactor, or a plurality of reactors may be used in order for increased residence time and for a higher temperature of 170-250° C. to allow the hematite particles to grow. These sampling units described allow for the removal of hematite solids at various stages of growth if desired. It has been found that with longer residence times, larger particles are produced. Thus, it is possible to grow hematite particles of any desired size.

The hematite solids are separated from the matrix solution by any suitable solid-liquid separation device 16 that may be kept hot, such as a vacuum or pressure filter. It is necessary to keep the liquid phase hot so that it does not freeze.

The use of column reactors in this manner eliminates the need for mechanical agitation, and therefore eliminates any problems associated with the choice of exotic materials of construction needed in this corrosive environment.

The Column reactor in a preferred embodiment comprises a gas expansion zone where the cross-sectional is defined through the base portion upward and expands to a second cross-sectional area assigned to permit the depressurization of hydrochloric acid gas produced within the reactor. At the gas expansion 20 of the reactor, there is a mixture of ferric chloride solution hydrochloric acid gas in combination with residual oxygen and possibly air, as well as matrix solution. The second surface area of the expansion zone is greater than that of the first surface area of the base portion of the reactor. The ratio of second surface area to first surface area is greater than 1 and preferably in the order of 1.2 to 1.5 and more preferably 1.8 to 2.

The top portion of the reactor may include two outlets: one for the hydrochloric acid (that will be condensed) along with residue oxygen; and a second for $HCl/O_2$ gas stream that could be fed into an second reactor. The top portion recirculating 52 also includes an inlet for the ferrous chloride containing barren solution and another inlet for the matrix solution (less the solids).

Where a single column reactor is used, fresh oxygen is sparged as bubbles into the bottom of the column reactor. The oxygen rises through the mixed solution in the reactor from the base and countercurrent to the barren solution feed entering from the top. Furthermore, recycled matrix solution 52 enters at the top of the reactor also flowing countercurrent to the flow of the gases moving upward. At the bottom of the column, a recycled matrix solution 50 including suspended hematite solids is withdrawn. A filter or other solid liquid separator is used to remove hematite and the now substantially solid free matrix solution 52 is returned to the top of the reactor. Although not shown, solids hematite may be seeded into the reactor to improve the precipitation reaction. In a preferred embodiment, a mixed stream of hydrochloric acid vapour and residual oxygen enter a condenser 164 where hydrochloric acid liquid 20 is produced and possibly recycled to the process. Unreacted oxygen gas may be compressed in compressor and recycled to the base of the column.

The hydrochloric acid so-produced is recycled to the leaching stage, and the hematite may be sold or disposed of. Thus, the process is closed-loop and there are no liquid effluents as such, generated in the process. Thus the process is free of liquid effluents significantly reducing the environmental impact of the gold recovery process 1. A liquid effluent stream is understood as one mainly comprising a liquid, or at least 51% liquid by weight.

The principles of the present invention are illustrated by the following examples, which are provided by way of illustration, but should not be taken as limiting the scope of the invention:

Example 1

100 g of arsenopyrite/pyrite tailings analysing 23.9% Fe, 12.7% As and 8 g/t Au were leached with ferric chloride and hydrochloric acid in a background solution of concentrated (400 g/L) magnesium chloride at 115° C. 63.8% of the Fe and 56.0% of the As in the feed reported to the final solution. No dissolved gold was detected in the solution.

Example 2

The test in example 1 was repeated, but for a longer time and with kinetic samples taken. The results are shown in the table below.

TABLE 1

Kinetic Samples During Test

| Time, hours | Au, mg/L | Extraction Fe, % | As, % |
|---|---|---|---|
| 1 | n.d. | 27.2 | 7.51 |
| 2 | n.d. | 40.0 | 9.89 |
| 3 | n.d. | 51.6 | 13.1 |
| 4 | n.d. | 41.0 | 11.4 |
| 6 | n.d. | 32.0 | 9.55 |

The data from this test confirm that gold was not leached in this system, despite the high chloride content. The data also show that iron and arsenic extraction increased and then decreased. The decrease in iron and arsenic was expected, and confirmed that ferric arsenate (the mineral scorodite) begins to form and report to the leach solids. This is important, as scorodite is an effective and accepted method of disposing of arsenic into the environment.

Example 3

175 g of the same sample of arsenopyrite tailings, analysing 23.9% Fe, 12.7% As and 8 g/t Au were leached in hydrochloric acid with the addition of nitric acid. The temperature of the reaction was 105° C. and the reaction carried out in an open vessel with no attempt to regenerate the nitric acid. The purpose of this test was to demonstrate gold recovery and the breakdown of the arsenopyrite.

The results showed that 96.5% of the gold reported to the solution, and high concentrations of iron and arsenic were noted.

TABLE 2

Kinetic Samples During Test

| Time, hours | Au, mg/L | Fe, g/L | As, g/L |
|---|---|---|---|
| 1 | 1.15 | 22.8 | 15.1 |
| 2 | 1.22 | 23.7 | 15.9 |
| 3 | 1.22 | 25.9 | 17.2 |
| 4 | 1.68 | 27.5 | 17.1 |

The data from these three examples demonstrate that the nitrogen species (in this case, nitric acid) aid in the dissolution of gold from the tailings samples. The data also indicate that iron and especially arsenic dissolve from the ore and that the arsenic then starts to re-precipitate.

Example 4

The solution from a series of the above tests in Table 2, with an initial gold concentration of 12.5 mg/L, was passed through a bed of ion exchange adsorbent XAD-7. Gold was not detectable in the barren solution after passage of 13 bed volumes. This, despite the high concentrations of ferric iron and arsenic in solution, and showing complete recovery of the gold.

Example 5

The barren solution from the above test with XAD-7 was heated to 110° C. in order to distil off the remaining free HCl and $HNO_3$. As the acid was removed, crystals of scorodite formed, and the iron and arsenic concentrations were reduced in solution. This test was carried out in order to demonstrate the effectiveness of the system in precipitating arsenic from solution. In normal practice, this may be carried out in a pressure vessel at a higher temperature in conjunction with the leaching step.

Example 6

A 100 g sample of a highly carbonaceous ore, assaying 7 g/t Au, 2.0% Fe, 0.88% As, 1.47% $S_T$ and 1.02% $C_T$ (0.95% organic C) was leached in 800 mL of ferric chloride and hydrochloric acid at 120° C., with the addition of nitric acid. The final solution after 3.5 hours assayed 0.8 mg/L Au, indicating a recovery of 92% of the gold. The final solids weight was 79.6 g, showing a mass loss of 20%. The subscript T in the terms $S_T$ and $C_T$ represents the total sulphur or carbon, which can be in any one of the many forms of sulphur or carbon.

Example 7

A sample of refractory gold ore analysing 1.7 g/t Au, 2.74% As, 3.68% Fe, wherein the arsenic was present as arsenopyrite, and the iron as a mixture of pyrrhotite and pyrite, was leached in hydrochloric acid with the addition of 10 g/L nitric acid at 110° C. At the end of four hours, there was no gold in solution.

The same test was repeated, except that only the hydrochloric acid was added initially. Hydrogen sulfide gas was evolved as the pyrrhotite mineral was decomposed, and the nitric acid was added only after there was no more evolution of hydrogen sulfide gas. After a further two hours of leaching, the final solution analysed 1 mg/L Au, and the final residue 0.01 g/t Au, showing >99% extraction of the gold in the ore. Additionally, the final solution analysed 5 mg/L Sc and 5 mg/L Ga, showing that these metals could also be recovered. These two tests demonstrate that high recoveries of gold are possible from refractory ores, but that first where a mineral such as pyrrhotite is present, it is necessary to destroy and remove it. This is because in an oxidising medium, pyrrhotite forms elemental sulfur, which coats the gold minerals and renders them passive.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and as may be applied to the essential features hereinbefore set forth, and as follows in the scope of the appended claims.

The invention claimed is:

1. A cyanide-free process for recovery of gold from an ore comprising the steps of:
    i) providing the ore comprising the gold to be recovered;
    ii) leaching the ore in a chloride oxidative medium, comprising nitric acid to produce a chloride solution comprising gold; and
    iii) recovering the gold from the chloride solution, wherein recovering the gold from the chloride solution is made by
    iv) contacting the chloride solution comprising gold with a resin adsorbent to selectively adsorb the gold and produce a barren solution and a loaded resin adsorbent; and
    v) stripping the gold from the loaded resin adsorbent by elution with diluted hydrochloric acid, wherein the barren solution is treated with a matrix solution to produce the chloride medium which is recycled to step ii), and hematite.

2. The process according to claim 1, wherein other precious metals may be recovered from the barren solution before the treatment with the matrix solution.

3. The process according to claim 1, wherein the nitric acid is regenerated in step ii) with oxygen.

4. The process according to claim 1, wherein arsenic species in the ore is converted to stable and environmentally benign scorodite.

5. The process according to claim 1, wherein the nitric acid is in a concentration of 1 to 50 g/L in the chloride oxidative medium.

6. The process according to claim 1, wherein a nitrogen species is continuously regenerated.

7. The process according to claim 1, wherein the leaching is made at a temperature of 80° C. to 160° C.

8. The process according to claim 1, wherein the ore is a refractory and/or carbonaceous ore.

9. The process according to claim 1, wherein the process is free of liquid effluent.

* * * * *